United States Patent [19]

Boeckman

[11] Patent Number: 4,491,689

[45] Date of Patent: Jan. 1, 1985

[54] AMPLIFIER FOR USE WITH TELEPHONE TRANSMITTER MOUNTED IN HAND HELD TELEPHONE UNIT

[75] Inventor: Eduard F. B. Boeckman, Huntsville, Ala.

[73] Assignee: GTE Business Communication Systems, Northlake, Ill.

[21] Appl. No.: 490,769

[22] Filed: May 2, 1983

[51] Int. Cl.³ .............................................. H01M 1/60
[52] U.S. Cl. .................................... 179/81 B; 179/103
[58] Field of Search ............... 179/81 R, 81 B, 100 L, 179/103, 100 R, 81 A; 381/120

[56] References Cited

U.S. PATENT DOCUMENTS 4,414,433 11/1983 Horie et al. .................... 179/81 B X Primary Examiner—Gene Z. Rubinson
Assistant Examiner—James L. Dwyer
Attorney, Agent, or Firm—Robert J. Black; Peter Xiarhos

[57] ABSTRACT

An amplifier for use with an electret microphone utilized as a telephone transmitter in a hand held telephone unit or handset. Incorporated into the circuitry is a band pass filter which substantially inhibits feedback "singing" which occurs because of reflection when the handset or telephone unit is placed in a downward position on a hard surface or similar environment. The filter circuitry employs the source resistance of the telephone transmitter and the input resistance of a transistor amplifier stage as elements of the included filter circuitry.

7 Claims, 1 Drawing Figure

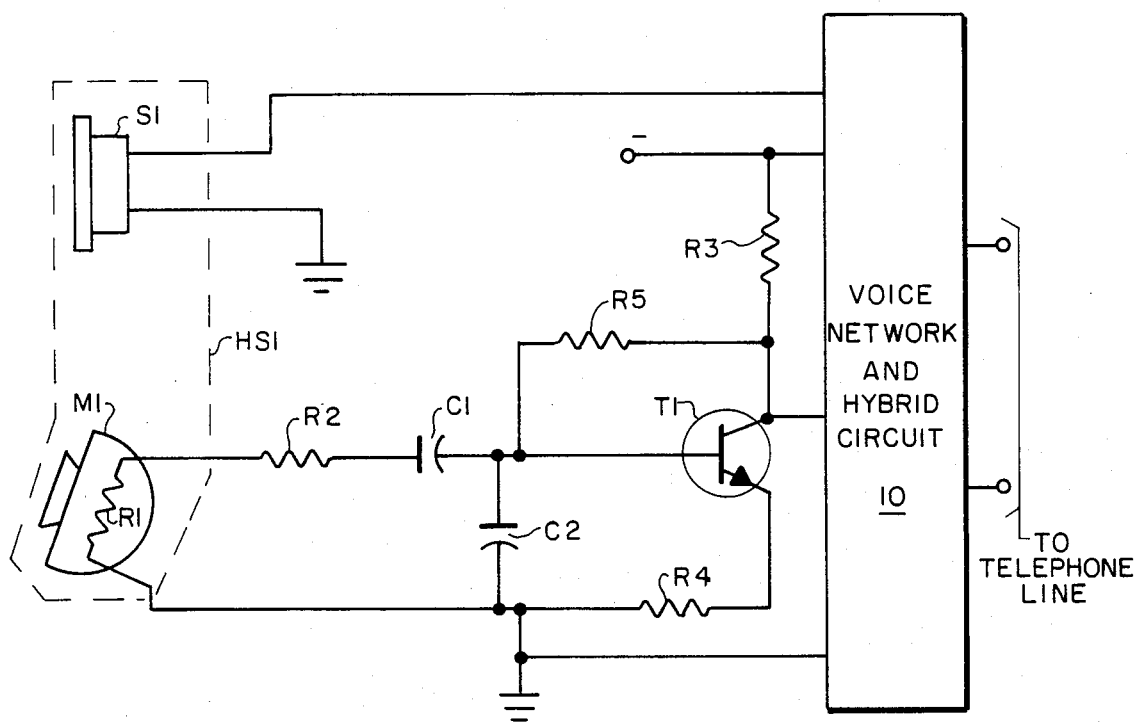

AMPLIFIER FOR USE WITH TELEPHONE TRANSMITTER MOUNTED IN HAND HELD TELEPHONE UNIT

BACKGROUND OF THE INVENTION

1. Technical Field

The present invention relates to amplifiers and more particularly to an amplifier for use with a telephone transmitter mounted in a hand held telephone unit.

2. Background Art

In recent years, many new high quality but low cost telephones have been developed for the business and residential telephone subscriber. Quite frequently these units employ telephone transmitters of low output that require amplification of voice signals picked up by the telephone transmitter. Often these telephone transmitters are of the electret type with an associated built in amplifier, preamplifier or buffer amplifier included in the handset or hand held telephone unit in which the telephone transmitter is mounted. The associated receiver also included in the same telephone handset or unit is usually a standard magnetic receiver and may or may not be driven by an associated amplifier. In such telephones the voice network may be located in the handset or hand held unit or may be located in the associated telephone base. This network may be of the coupled coil type or of the integrated circuit variety.

Previous amplifier designs for use in such telephones did not take into account the hazard of feedback present under certain sound reflective conditions, where output from the handset receiver is picked up by the microphone and reinforces the output of the receiver because of the normal sidetone available in the voice network. Such "singing" is defined as an oscillation that occurs usually in the frequency range of from 2,000 to 3,000 Hz and is audible without holding the telephone receiver close to the subscriber's ear. This condition typically occurs only under extreme conditions when the handset is placed downward or in a reflective corner environment forming a type of resonant cavity around the microphone and the receiver.

Most previous designs were found to have this loud and objectionable "singing" under certain conditions, which could be transmitted over the telephone line to the other party. Early attempts to solve this problem resulted in a reduction in the transmit gain. Obviously, such signal reduction is not desirable particularly if the transmitter is to be used in anything other than short loop environments. One method used to stop the singing, involved using a feedback loop from the output of the telephone transmitter amplifier back to its input. This particular technique resulted in substantial loss in transmit level.

SUMMARY OF THE INVENTION

The present invention consists of an amplifier circuit for use between a telephone transmitter and an associated telephone line, where the telephone transmitter is a microphone of the electret type. The present amplifier incorporates therein the techniques of phase shifting and a high frequency roll off band pass filter utilizing the source resistance of the telephone transmitter and the input resistance of a transistor stage that provides the necessary amplification, as elements in a band pass filter which provides the necessary high frequency roll off to prevent the feedback "singing".

The only other components needed to complete the filter circuitry are two capacitors. The first of which is connected between the microphone and the above referenced transistor amplifier stage and the other between the transistor input stage and the common or ground connection of an associated power supply which provides the necessary potential for the amplifier. Additional resistance may also be included between the telephone transmitter and the first capacitor referenced above if necessary to adjust the signal transfer function characteristics of the filter.

The telephone transmitter amplifier of the present invention employs the common emitter configuration with appropriate resistances connected between the emitter and the common or ground terminal of an associated power source. A load resistance between the other terminal of the referenced power supply and a feedback resistance connected between the collector and base of the included transistor. The net result of the circuit configuration is a four element band pass filter incorporating the telephone transmitter source resistance in series with a capacitor extending to the input of the transistor amplifier stage with the input resistance of that stage and a second capacitor extending from said input to ground forming the necessary elements of the filter. To optimize the effect of the filter to inhibit "singing" as noted above, it has been found desirable to properly phase connection of the signal leads to the telephone receiver also included in the telephone handset or hand held unit.

BRIEF DESCRIPTION OF THE DRAWINGS

The attached drawing is a schematic diagram of an amplifier circuit for use with a telephone transmitter mounted in a telephone handset or hand held telephone unit.

DESCRIPTION OF THE PREFERRED EMBODIMENT

Referring now to the single FIGURE of the attached drawings, a schematic diagram of the present invention is shown. The circuitry is designed to utilize a minimum number of components for purposes of economy and simplicity and includes microphone M1 which has an inherent source resistance represented as R1. The output of the microphone M1 is in turn connected through a capacitor C1 to the base of transistor T1. As shown in the drawings additional resistance R2 is also shown serially connected between transmitter M1 and capacitor C1. The inclusion of resistor R2 may or may not be necessary to adjust the signal transfer function characteristics of the disclosed circuit. Transistor T1 which provides the necessary amplification is connected at its collector through load resistor R3 to a source of potential. Return through the emitter, is made through resistance R4 to the other terminal of the connected power supply. A feedback resistor is also connected between the collector and base of transistor T1.

In one practical embodiment of the present invention, it has been found that the following values for some of the included components have been desirable:

| Capacitor C2 | .068MFD |
|---|---|
| Resistor R3 | 470 Ohms |
| Resistor R4 | 91 Ohms |
| Resistor R5 | 68,000 Ohms |

As noted above, resistance R1 represents the source resistance of the telephone transmitter with resistance R2 providing any additional resistance desired in the filter portion of the circuitry of the present invention. Capacitor C1 functions as a combined DC blocking, AC coupling and filter element for the circuit while capacitor C2 is a filter element which regulates phase shift and the high frequency roll off rate of the filter circuit. The load resistance of the filter is the equivalent input resistance of the transistor stage including transistor T1 and may be determined by the following quotation:

$$\text{Equation: } R_2 = B\left(\frac{1}{gm} + R_E\right) \parallel (R_F + R_L)$$

This is the typical equation for the input resistance of a common emitter transistor amplifier stage where:
 B = transistor current gain
 gm = transconductance of transistor
 $R_E$ = resistance value in the emitter circuit of the stage
 $R_F$ = feedback resistance
 $R_L$ = Load resistance
The transfer function is then:

$$\text{Equation: } T(s) = \frac{KS}{S^2 + aS + b} = \frac{E_B}{E_A}$$

This is a standard transfer function equation for a band pass filter network. $E_B$ is the output voltage for a certain input voltage, $E_A$, and the ratio of the two quantities is the transfer function. S is the operator $\sqrt{-1}xw$ where w equals $2\pi$ times the signal frequency f.
Note: $j = \sqrt{-1}$ K, a, and b are constants related to the filter component values, $R_1$, $R_2$ and $C_1$, $C_2$, resistance and capacitance values, respectively.

$$K = \frac{1}{R_1C_1}$$

$$a = \frac{R_1C_1 + R_2C_2 + R_2C_1}{R_1R_2C_1C_2}$$

$$b = \frac{1}{R_1R_2C_1C_2}$$

The values K, a and b determine the shape of the response of the circuit vs. frequency, (standard technique) and determine phase shift vs. frequency also.

The following equation is a re-formulation of the transfer function equation which shows that it can be written as a complex quantity or vector with properties of phase and magnitude.

$$\text{Equation: } T = \frac{Q}{P^2 + R^2}(R + jP)$$

From the quantity R+jP we obtain the phase angle $\theta = \arctan P/R$ (an angle whose tangent is P/R).

The phase shift introduced by the filter network is important to the anti-singing properties of the invention. The phase shift is related back to the constants b and a through the equations $$P = b - w$$

$$R = aw$$

where $W = 2\pi f$

By adjusting the component values $R_1$, $R_2$, $C_1$, $C_2$, it is possible to adjust the values of K, a and b and thereby adjust the amplitude and phase vs. frequency for the filter.

In the practical embodiment of a hand held telephone unit employing circuitry in accordance with the present invention, a phase shift of approximately 37° and a roll off of approximately 2 dB at 3,000 Hz was required to prevent singing in a reflective corner test. It should also be noted at this time that if the input resistance of the transistor stage is sufficiently high, say for example 5,000 Ohms or higher as a minimum, variations up to 50% in this value will not substantially affect the phase shift and roll off characteristic, so that the filter network will still produce the desired resistance to singing. It is also important that the source resistance of telephone transmitter M1 be of a relatively low value (approximately 200 to 1,000 Ohms). As noted previously, proper receiver phasing is also required to cancel sidetone reinforcement through the microphone amplifier. This is typically accomplished by proper connection of the receiver signal leads.

As noted above, capacitor C1 functions as a filter and coupling element and determines the low frequency pass characteristics of the disclosed circuit. It also blocks DC from the telephone transmitter. Capacitor C2 functions as a filter element serving the multipurpose of filtering out RF noise and controlling phase shift and roll off at high frequency. The transistor T1, is shown as connected as a common emitter amplifier stage with collector to base feedback biasing for stabilization. However, it should be noted that the invention is not limited to this type of amplifier but is applicable with different amplifier configurations.

It shall be obvious to those skilled in the art that numerous modifications of the present invention may be made without departing from the spirit of the invention which shall be limited only by the scope of the claims appended hereto:

What is claimed is:

1. In combination, a telephone line, a hand held telephone unit including a telephone receiver and a telephone transmitter, connected to said telephone line, and an amplifier for said transmitter, said amplifier comprising: first and second circuit connections to a source of DC power; a transistor stage including an input and an output; a first filter element including said telephone transmitter; a second filter element connected between first filter element and said transistor stage input; a third filter element connected between said transistor stage input and said first circuit connection to said DC power source; and a fourth filter element including said transistor stage; said first, second, third and fourth filter elements in combination, comprising a band pass filter controlling the high and low frequency response of said telephone transmitter, whereby feedback oscillation coupled to said telephone receiver is substantially inhibited.

2. In combination as claimed in claim 1 wherein: said first filter element comprises the resistance of said telephone transmitter.

3. The combination as claimed in claim 2 wherein: there is further included an additional resistance connected between said telephone transmitter and said second filter element.

4. The combination as claimed in claim 2 wherein: said second filter element comprises a capacitor.

5. The combination as claimed in claim 1 wherein: said third filter element comprises a capacitor.

6. The combination as claimed in claim 1 wherein: said transistor stage comprises a transistor including first, second and third electrodes; a load resistance connected between said second circuit connection to said source of DC power and said second electrode; a bias resistance connected between said third electrode and said first circuit connection to said DC power source; and a feedback resistance connected between said second electrode and said first electrode; said transistor stage input connected to said first electrode and said transistor stage output connected to said second electrode.

7. The combination as claimed in claim 6 wherein: said fourth filter element comprises the resistance of said transistor stage input.

* * * * *